United States Patent [19]
Ouellet

[11] Patent Number: 5,007,211
[45] Date of Patent: Apr. 16, 1991

[54] INFLATABLE DOCK SEAL

[75] Inventor: Wilfred P. Ouellet, Cranston, R.I.

[73] Assignee: L.K. Goodwin Co., Inc., Providence, R.I.

[21] Appl. No.: 495,285

[22] Filed: Mar. 16, 1990

[51] Int. Cl.5 ............................................. E04B 1/34
[52] U.S. Cl. ................................. 52/2.12; 52/173 DS
[58] Field of Search ........................... 52/173 DS, 2 C; 14/71.5

[56] References Cited

U.S. PATENT DOCUMENTS

| | | | |
|---|---|---|---|
| 3,816,867 | 6/1974 | Shirzad et al. | 52/173 DS |
| 4,750,299 | 6/1988 | Frommelt et al. | 52/2 C |
| 4,821,468 | 4/1989 | Moore | 52/2 C |

FOREIGN PATENT DOCUMENTS

| 958946 | 10/1974 | Canada | 52/173 DS |
|---|---|---|---|

*Primary Examiner*—Richard E. Chilcot, Jr.
*Attorney, Agent, or Firm*—Salter & Michaelson

[57] ABSTRACT

An inflatable dock seal includes inflatable top and side seal sections which are adapted to be secured to a building wall adjacent the top and side extremities of a loading dock opening therein, an inflating mechanism for inflating the top and side seal sections and a retracting mechanism for retracting the top and side seal sections when the inflating mechanism is deactuated. In one embodiment of the dock seal the retracting mechanism includes constant force springs for retracting the top and side seal sections thereof and in a second embodiment the retracting mechanism includes a constant force spring for retracting the top seal section thereof and a pair of resiliently expandable cord elements for retracting the side seal sections thereof. In both embodiments of the dock seal the side seal sections are preferably adapted to extend angularly outwardly from the respective building walls on which they are mounted and inwardly toward the respective loading dock openings thereof so that they are more effective for yieldably engaging the side surfaces of truck bodies stationed at the respective loading dock openings thereof.

14 Claims, 10 Drawing Sheets

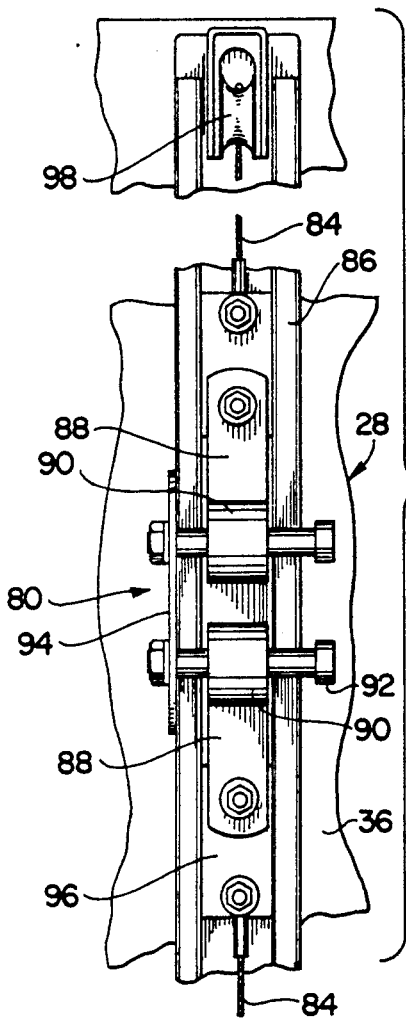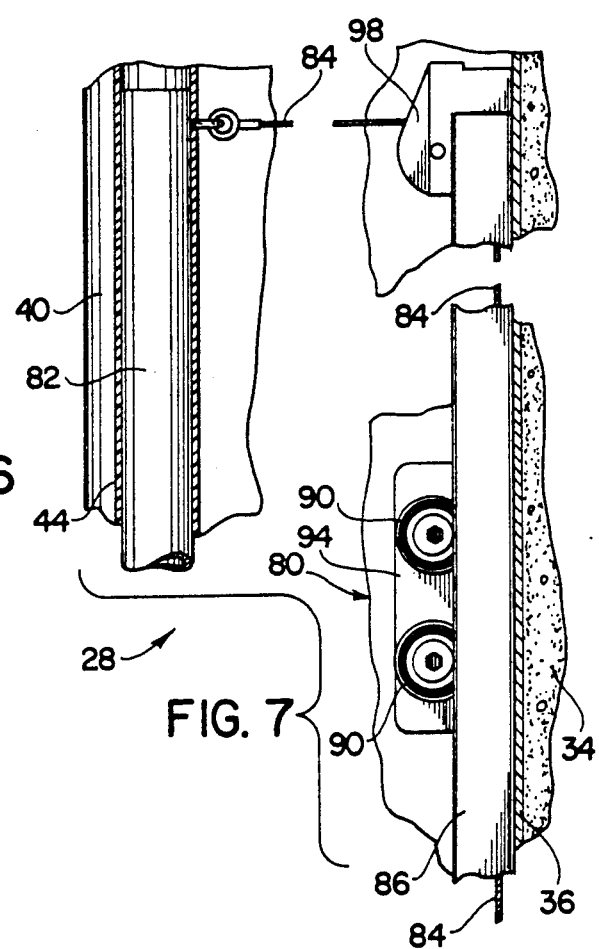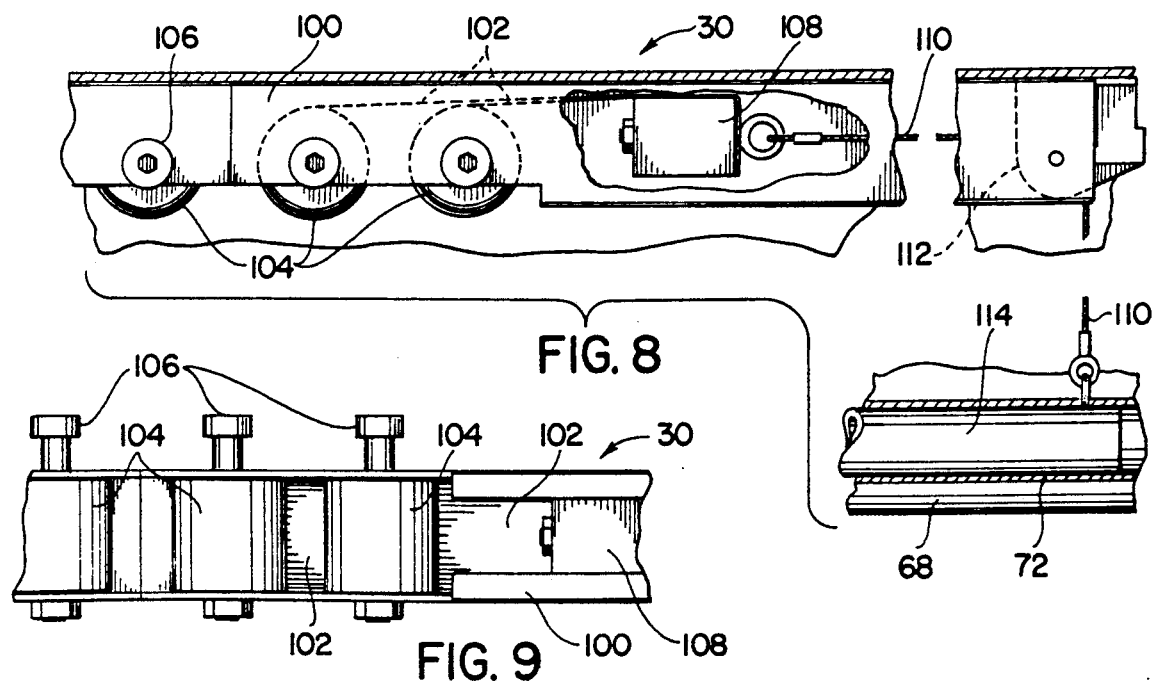

INFLATABLE DOCK SEAL

BACKGROUND AND SUMMARY OF THE INVENTION

The instant invention relates to loading docks and more particularly to an inflatable dock seal for enclosing the area between a loading dock opening in a building wall and a truck stationed at the loading dock opening during an unloading or loading operation.

It has been found that the inflatable dock seals, such as the one disclosed in the applicant's prior U.S. Pat. No. 3,994,103, can be effectively utilized for enclosing the areas between the bodies of trucks positioned at loading dock openings in building walls and the adjacent building walls. An inflatable dock seal of this type generally comprises a plurality of elongated tubular inflatable sections which are securable to a building wall adjacent a loading dock opening and a blower mechanism for inflating and maintaining the tubular members in expanded dispositions during loading and unloading operations. It has been found that because dock seals of this type are operative for yieldably engaging the surfaces of truck bodies they can be utilized for enclosing the areas between building walls and the bodies of trucks despite minor variations in the sizes, surface configurations and positions of truck bodies relative to loading dock openings. Accordingly, it has generally been found that dock seals of this type can be effectively utilized for enclosing the areas between the bodies of individual trucks stationed at loading dock openings and the adjacent building walls so that controlled environments within buildings associated with loading dock openings are not disrupted during truck loading and unloading operations.

While dock seals of the above described type have generally been found to be effective for sealing the open areas between the bodies of trucks stationed at loading dock openings in building walls and the adjacent building walls, it has frequently been found that when dock seals are not in use they hang loosely from the surfaces of building walls so that they are unsightly and prone to flapping loosely in the wind. In this regard, while some of the previously available dock seals have included externally mounted counterweight-type retracting mechanisms for retracting the inflatable portions thereof when they are not in use, the previously available counterweight retracting mechanisms have generally also been found to be unsatisfactory. Specifically, they have been found to be highly prone to malfunctioning when they are exposed to sever weather conditions, such as snow, sleet, or freezing rain.

In addition to the above, many of the previously available dock seals have often been found to be incapable of effectively compensating for other than minor variations in the sizes of truck bodies and/or for accommodating for other than minor misalignments in the positions of trucks located at loading dock openings. This is because the previously available dock seals have generally either been adapted to extend directly outwardly from the walls of buildings around loading dock openings, directly inwardly into loading dock openings or directly outwardly from the walls around loading dock openings and then directly inwardly into the openings making them incapable of compensating for significant variations in the lateral positions of the vertical surfaces of truck bodies stationed at loading docks.

The instant invention provides an effective dock seal which overcomes many of the disadvantages of the previously available inflatable dock seals. Specifically, the instant invention provides an inflatable dock seal which includes a plurality of inflatable portions and an improved resilient retracting mechanism for retracting the inflatable portions when the seal is not in use. More specifically, the dock seal of the instant invention includes a pair of opposite side seal sections which are securable to a building wall adjacent opposite side extremities of a loading dock opening and a top seal section which is securable to the building wall adjacent the top extremity of the loading dock opening so that the top seal section extends between the side seal sections. Each of the top and side seal sections includes an inflatable portion which is inflatable to an expanded disposition and retractable to a collapsed disposition and the seal further includes resilient constant force spring means for resiliently retracting at least a portion of the inflatable portions of the side seal sections and the top seal section.

In one embodiment of the dock seal, the spring means comprises a pair of resilient side recoil band assemblies and a resilient top recoil band assembly which are mounted within the inflatable portions of the side seal sections and the top seal section, respectively, and operative for retracting the side seal sections and the top seal section, respectively. In this embodiment the inflatable portions of the side seal sections are preferably unsupported at the upper ends thereof and they are adapted to be mounted on a building wall so that they extend angularly outwardly from the building wall around a loading dock opening and inwardly and together toward the opening when they are in the inflated dispositions thereof. In this embodiment the top seal section preferably includes a support platform which is securable to the wall of a building so that it extends outwardly therefrom and an inflatable portion on the support platform which is downwardly expandable in outwardly spaced relation to the building wall.

In a second embodiment of the seal of the instant invention the retracting means comprises a resilient recoil band assembly for retracting the inflatable portion of the top seal section and a pair of resilient cord retracting mechanisms for retracting the inflatable portions of the side seal sections. The cord retracting mechanisms preferably include elongated resiliently extendable cords having at-rest lengths which are at least approximately half of the height of the side seal sections and mounted within the inflatable portions of the side seal sections. In this embodiment the top seal section and the side seal sections are preferably integrally connected and the side seal sections are preferably adapted so that they extend angularly outwardly from a building wall around a loading dock opening and inwardly and together toward the opening when they are in the inflated dispositions thereof and the top seal section is preferably adapted so that it extends angularly outwardly and downwardly when it is in the inflated disposition thereof.

It has been found that the dock seal of the instant invention can be effectively utilized for enclosing the open area between the wall of a building wall surrounding a loading dock opening and the body of a truck stationed at the loading dock opening. Specifically, it has been found that because the side seal sections of the seal of the instant invention are preferably adapted so that they extend angularly outwardly from a building wall and inwardly and together toward an adjacent loading dock opening, they can more effectively accommodate variations in the sizes and positions of trucks stationed at the loading dock opening. Further, because the seal includes constant force spring retracting means for resiliently retracting at least some of the inflatable portions of the seal sections, the retracting means can be effectively utilized for automatically retracting the inflatable portions without interfering with the ability of the inflating means to inflate the seal to a fully expanded disposition. Further, because the retracting means for the various sections of the seal are located within their respective inflatable portions, the retracting means is fully protected against the elements and hence not prone to failure.

Accordingly, it is a primary object of the instant invention to provide an inflatable dock seal which includes an improved retracting mechanism.

Another object of the instant invention is to provide an inflatable dock seal which includes a resilient constant force spring retracting mechanism.

An even further object of the instant invention is to provide an inflatable dock seal which is adapted to effectively accommodate minor variations in the dimensions and positions of the bodies of trucks stationed at a loading dock.

An even still further object of the instant invention is to provide an improved dock seal comprising inflatable side seal sections which are securable to a building wall around a loading dock opening and constructed so that they extend angularly outwardly from the building wall and inwardly and together toward the opening for engaging the side surfaces of the bodies of trucks stationed at the loading dock opening.

Other objects, features and advantages of the invention shall become apparent as the description thereof proceeds when considered in connection with accompanying illustrative drawings.

DESCRIPTION OF THE DRAWINGS

In the drawings which illustrate the best mode presently contemplated for carrying out the present invention:

FIG. 6 is a sectional view taken along line 6—6 in FIG. 5;

FIG. 7 is a fragmentary side sectional view of one of the side retracting mechanisms;

FIG. 8 is a sectional view taken along line 8—8 in FIG. 5;

FIG. 9 is a fragmentary bottom plan view of the retracting mechanism illustrated in FIG. 8;

DESCRIPTION OF THE INVENTION

Figure 1:
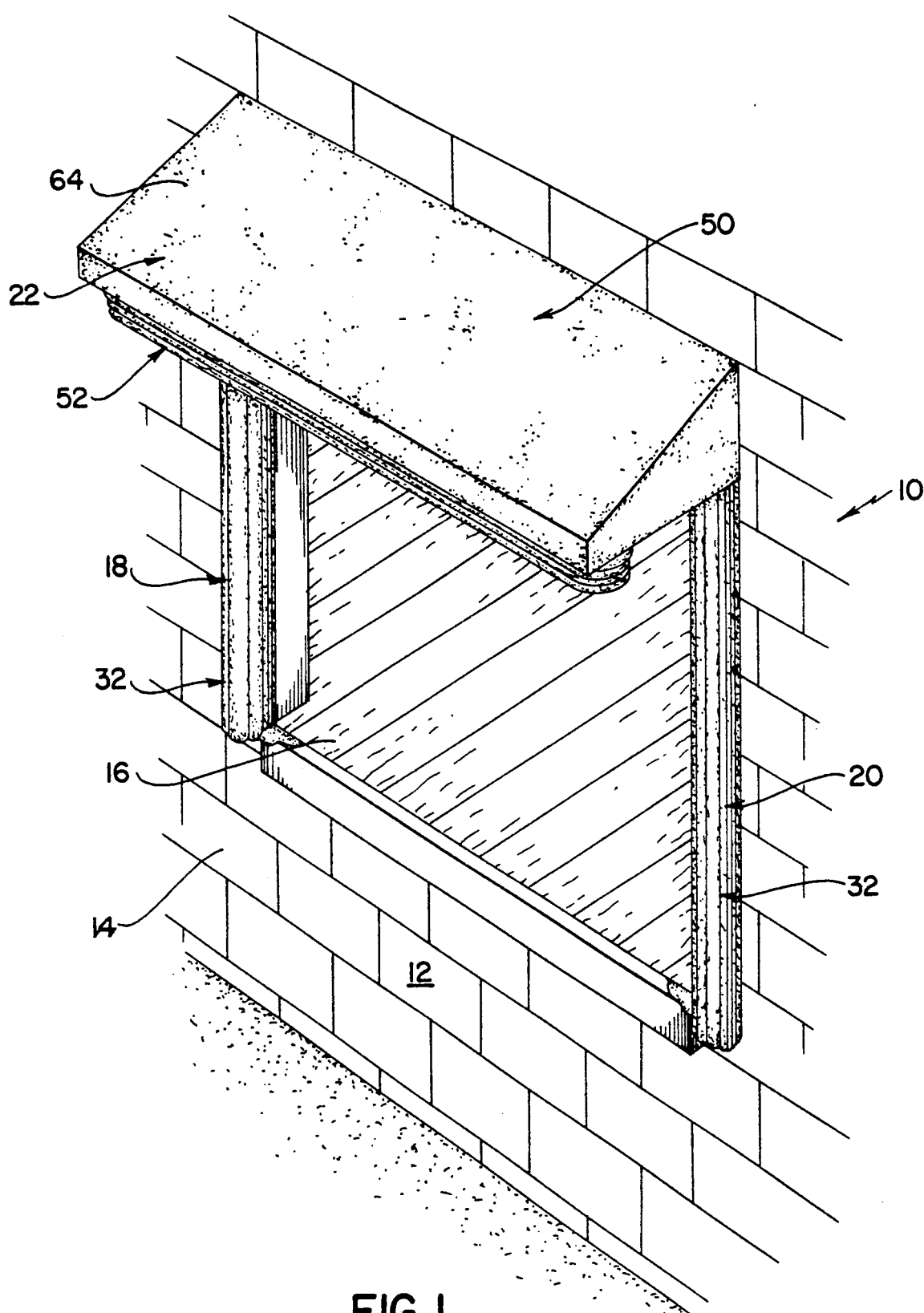
FIG. 1 is a perspective view of a first embodiment of the dock seal of the instant invention in a collapsed disposition mounted on a building wall.
Figure 2:
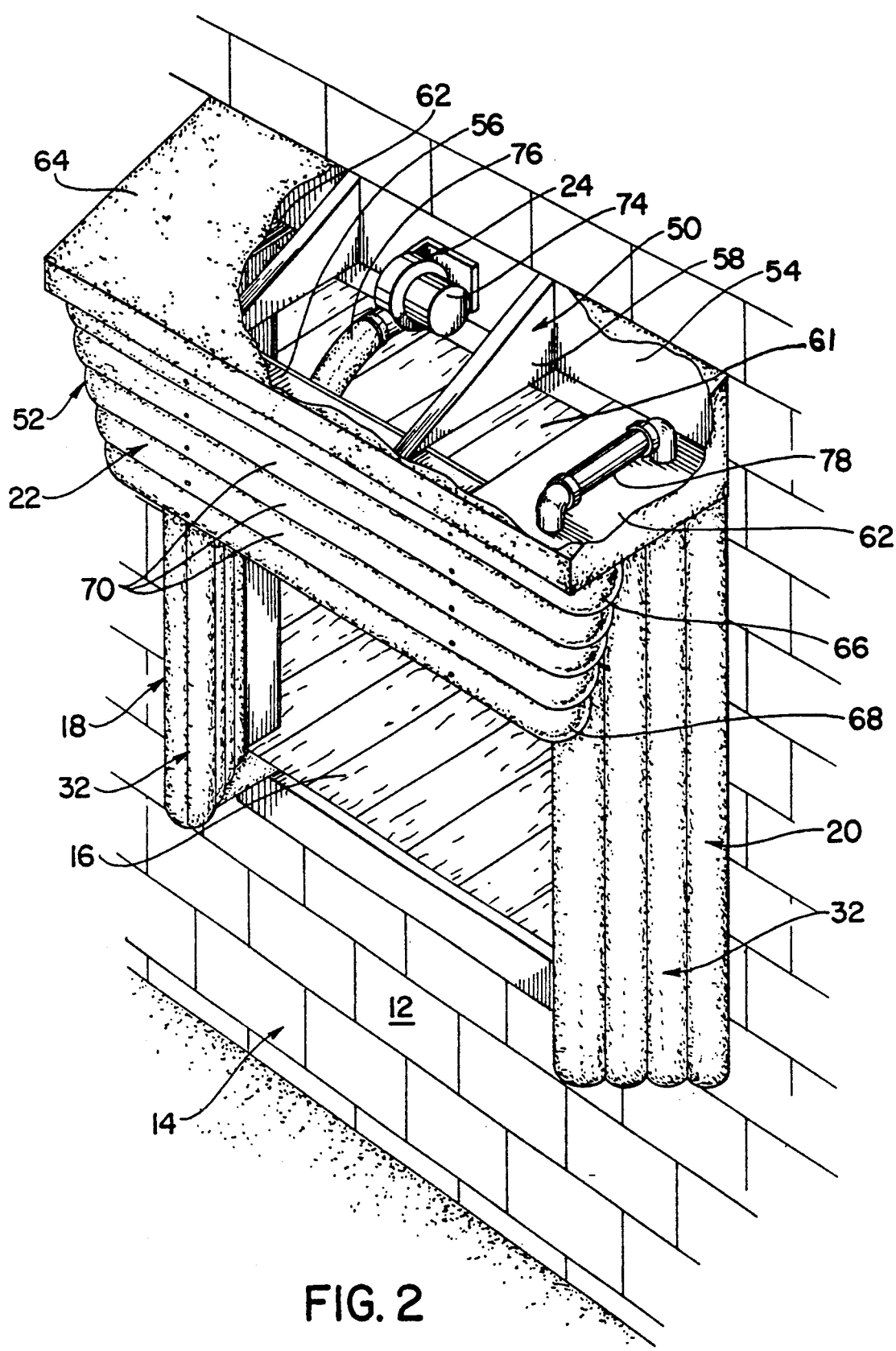
FIG. 2 is a similar perspective view with the seal in an inflated disposition.
Figure 3:
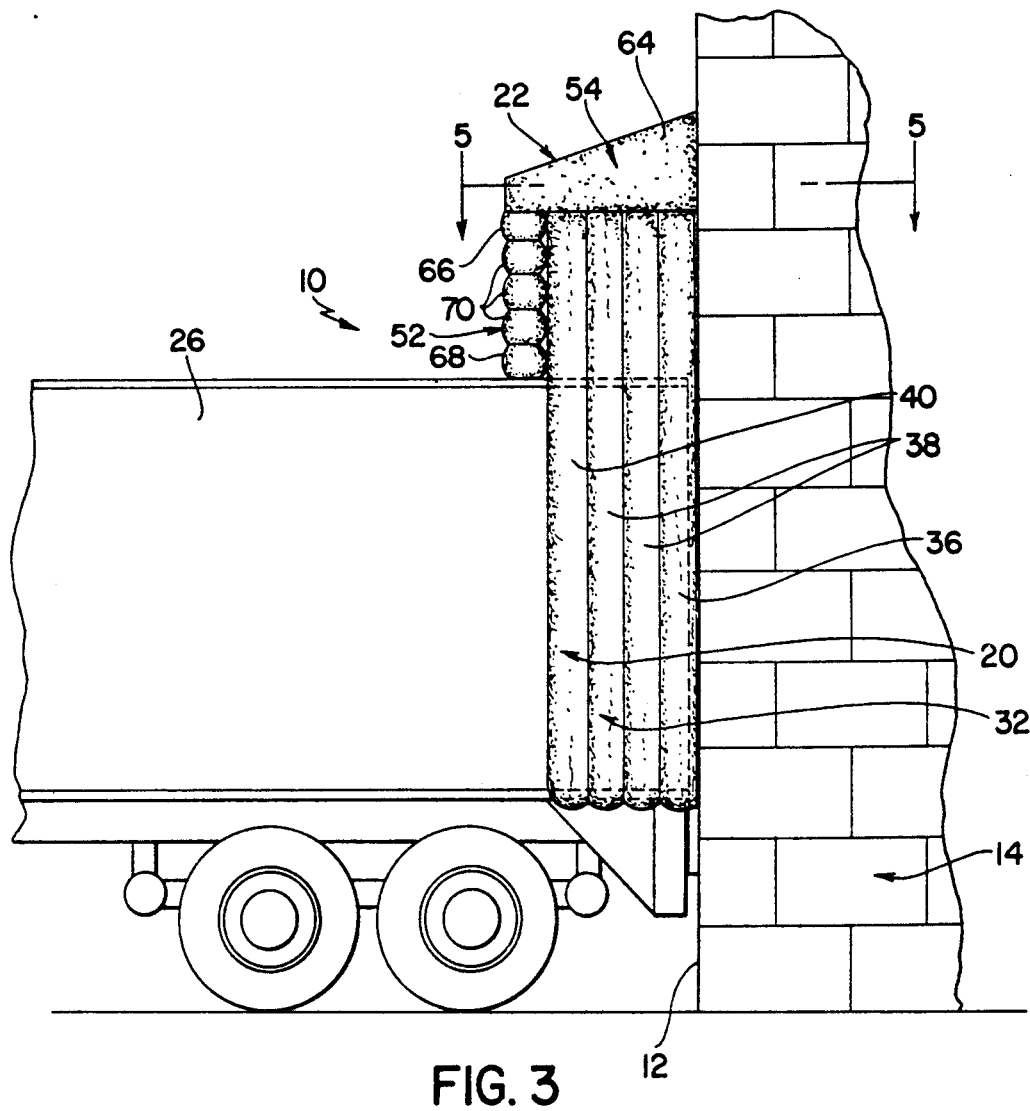
FIG. 3 is a side elevational view of the seal in an 10 inflated disposition in engagement with the body of a truck.
Figure 4:
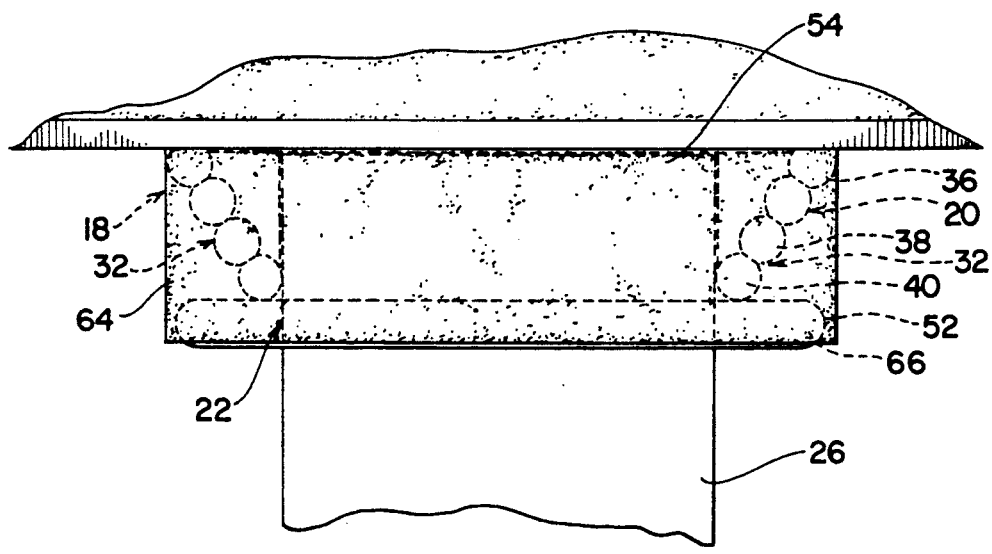
FIG. 4 is a top plan view thereof.

Referring now to the drawings, a first embodiment of the dock seal of the instant invention is illustrated in FIGS. 1-9 and generally indicated at 10 in FIGS. 1-4. The dock seal 10 is adapted to be mounted on a wall 12 of a building 14 so that it extends around the top and side extremities of a loading dock opening 16 in the wall 12. The seal 10 includes a top seal section generally indicated at 18, a pair of side seal sections generally indicated at 20 and 22, and a blower assembly generally indicated at 24, and it is adapted to be inflated to the expanded disposition illustrated in FIGS. 2-4 wherein it is operative for yieldably engaging the surfaces of a truck body generally indicated at 26 in order to enclose the open areas between the truck body 26 and the wall 12. The seal 10 further includes a pair of side retracting assemblies generally indicated at 28 in FIGS. 5-7 and a top retracting assembly generally indicated at 30 in FIGS. 8 and 9 which are operative for retracting the side seal sections 20 and 22 and the top seal section 18, respectively, to the retracted positions thereof illustrated in FIG. 1 when the blower assembly 24 is deactuated.

Each of the side seal sections 20 and 22 includes an inflatable portion generally indicated at 32 and a mounting board 34. Each of the inflatable portions 32 is preferably constructed from a suitable durable, abrasion resistant, air tight fabric, such as a vinyl coated nylon. The inflatable portions 32 each include an elongated inner inflatable tubular section 36, a pair of elongated intermediate inflatable tubular sections 38 and an elongated outer end inflatable tubular section 40. The tubular sections 36, 38 and 40 are disposed in substantially vertical dispositions and adjacent tubular sections 36, 38 and 40 are connected through interior partitions 42. The partitions 42 are preferably made from a flexible screening material to provide open air communication between the interiors of adjacent tubular sections 36, 38 and 40. The inner tubular sections 36 are secured to the mounting board 34 via suitable means, such as staples and/or an adhesive, and the outer tubular section 44 includes an integrally formed vertically disposed retracting sleeve 44 at the outer end thereof. The attachment boards 34 are adapted to be secured to the wall 12 by suitable means, such as nails, screws and/or an adhesive, and the inflatable portions 32 are adapted to be inflated to the expanded dispositions illustrated in FIGS. 2-5 wherein they extend angularly outwardly from the wall 12 and inwardly and together toward the opening 16. The upper ends of the inner tubular sections 36 include feeder openings 46 for receiving air in the inflatable portions 32 and retainer cables 48 are attached to the side seal sections 20 and 22 for retaining the inflatable portions 32 in angularly outwardly extending relation from the wall 12 when the side seal sections 20 and 22 are in the expanded or inflated dispositions thereof. The upper ends of the tubular sections 36, 38 and 40 are preferably closed and unsupported by either the wall 12 or the top seal section 18.

The top seal section 18 comprises a support frame assembly generally indicated at 50 and an inflatable portion generally indicated at 52. The support frame assembly 50 includes an attachment plate 54, a platform structure 56 and a plurality of platform supports 58. The attachment plate 54, the platform structure 56 and the platform supports 58 are preferably made from a suitable wood or metal and the platform supports 58 extend outwardly and downwardly from the attachment plate 54 for supporting the platform structure 56 in a substantially horizontal disposition wherein it extends outwardly from the wall 12. The platform structure 56 includes spaced inner and outer beams 60, a horizontal main panel 61, and a pair of horizontal opposite end panels 62 which are secured to the beams 60 so that they are positioned above the side seal sections 20 and 22. The support section 50 further includes a canopy 64 for enclosing the interior of the support section 50, the canopy 64 being made from a suitable waterproof material, such as a vinyl covered nylon. The inflatable portion 52 includes an elongated horizontal upper tubular section 66, an elongated horizontal lower tubular section 68 and a plurality of elongated horizontal intermediate tubular sections 70, all of which are preferably made from a suitable durable air tight fabric, such as a vinyl coated nylon, the tubular sections 66, 68 and 70 being connected with intermediate partitions (now shown) made from a flexible screening material to permit open air communication therebetween. The upper tubular section 66 is attached to the support platform 56 in outwardly spaced relation to the wall 12 and the inflatable portion 52 is constructed so that it extends substantially directly downwardly from the support platform 56 in outwardly spaced relation to the wall 12 when the inflatable portion is in an expanded or inflated disposition. As illustrated in FIG. 8, the bottom horizontal tubular section 68 includes an elongated integrally formed horizontal retracting sleeve 72 for retracting the inflatable portion 52 in a manner which will hereinafter be more fully set forth.

The blower mechanism 24 is preferably mounted on the attachment plate 54 of the support frame assembly 50 and it includes an air blower 74 which communicates with the upper tubular section 66 of the top seal section 18 through a blower hose 76. The blower assembly 24 further includes a pair of side feeder lines 78 which extend from the upper tubular section 66 of the top seal section 18 to the feeder openings 46 of the inner tubular sections 36 of the opposite side seal sections 20 and 22. Accordingly, the blower communicates with the side seal sections 20 through the top seal section 18 so that when the blower 24 is in an actuated condition it is operative for inflating the inflatable portion 52 of the top seal section 18 as well as the inflatable portions 32 of the side seal sections 20 and 22.

Figure 5:
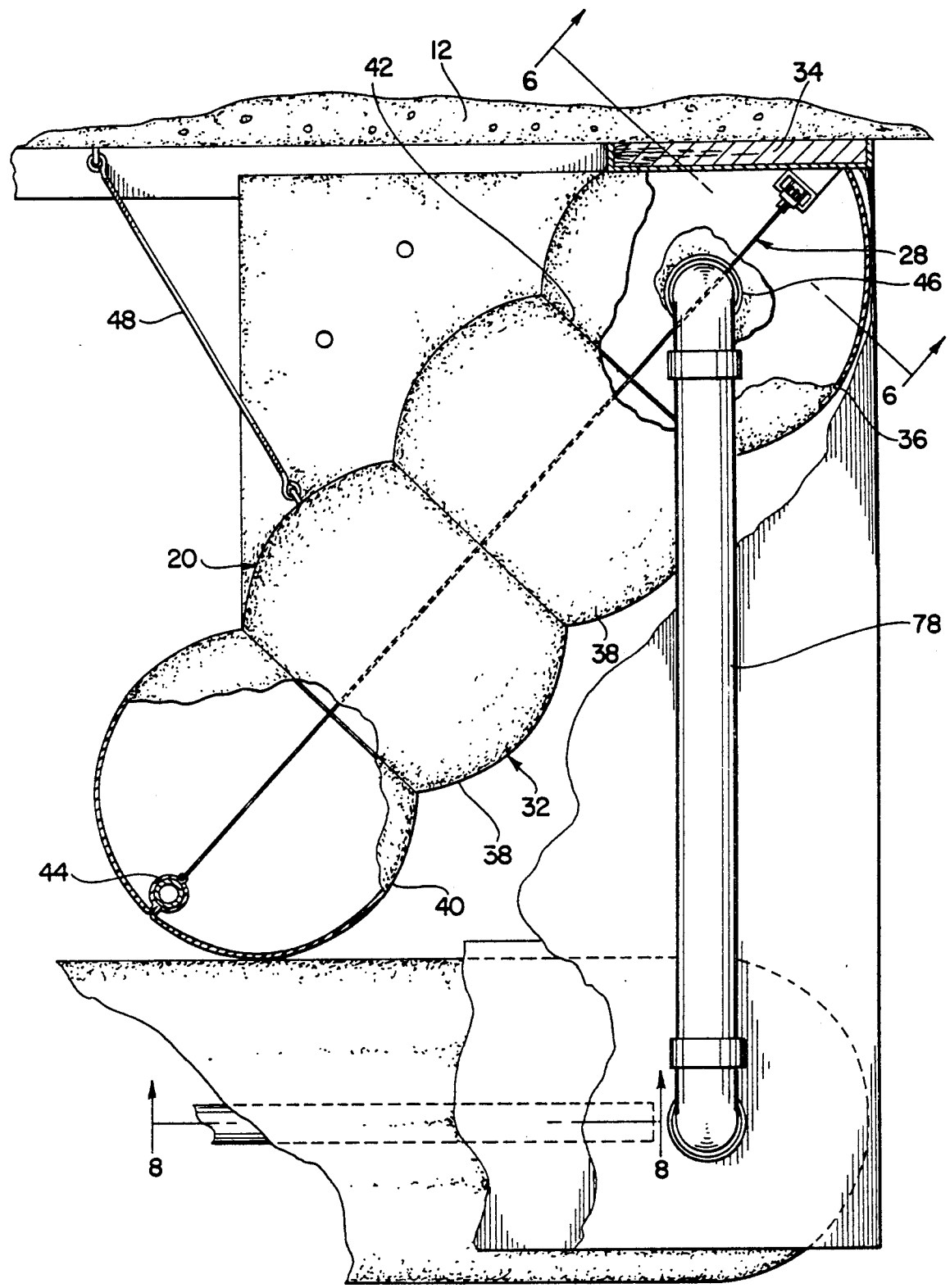
FIG. 5 is a sectional view taken along line 5—5 in FIG. 3.
Figure 10:
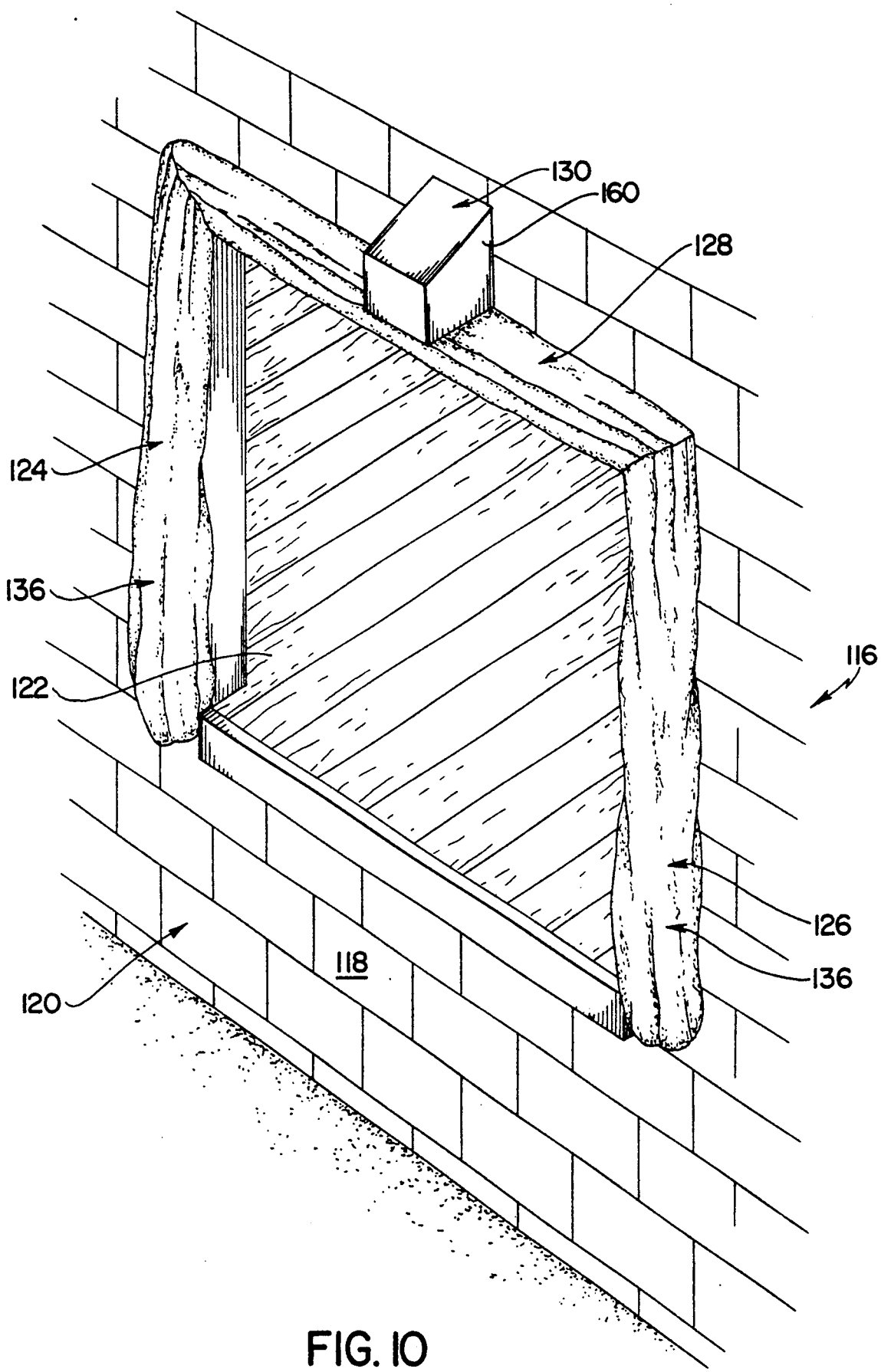
FIG. 10 is a perspective view of a second embodiment of the dock seal of the instant invention in a collapsed disposition mounted on a building wall.
Figure 11:
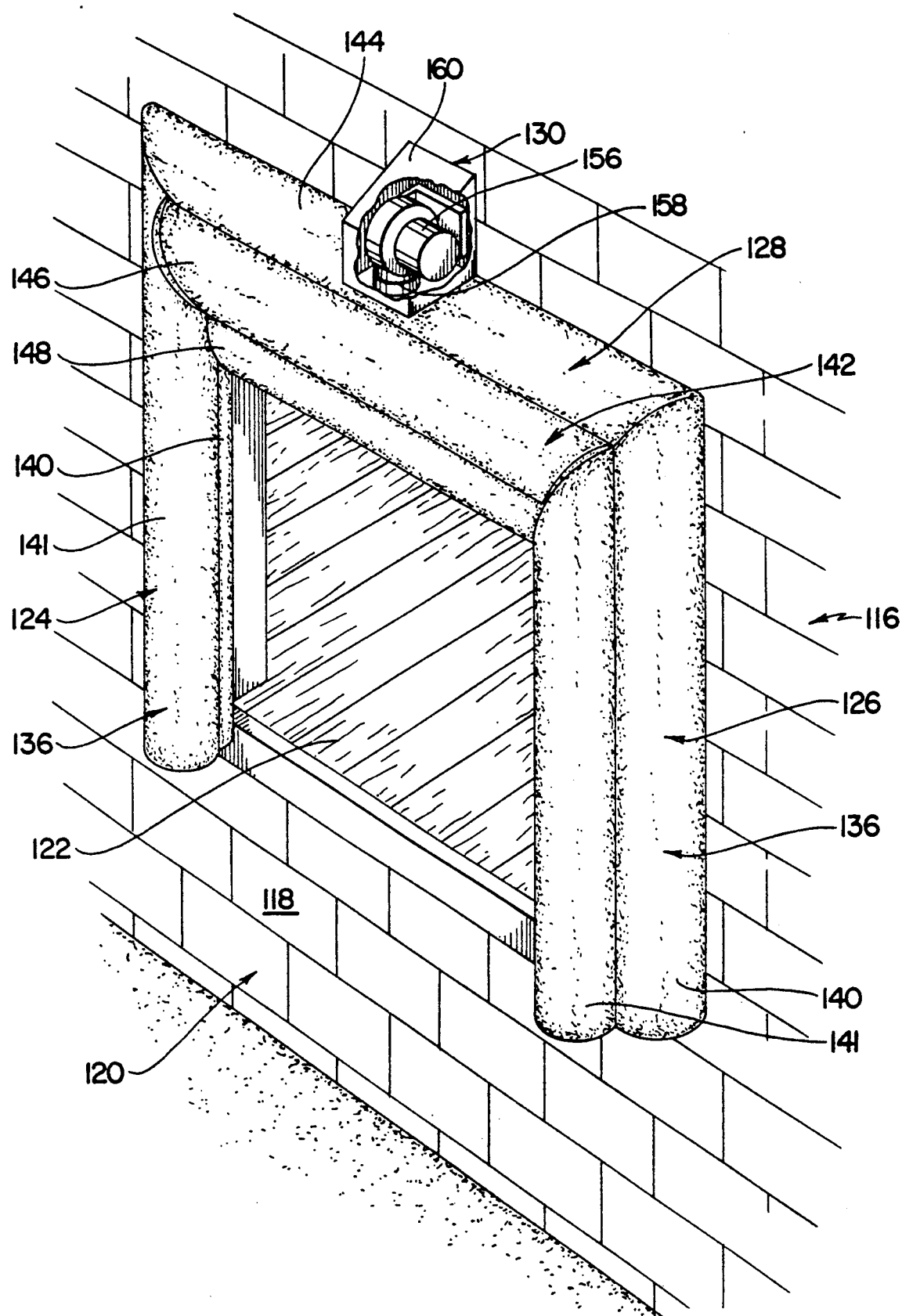
FIG. 11 is a similar perspective view with the seal in an inflated disposition.

As illustrated in FIGS. 5-7, each of the side retracting mechanisms 28 comprises a resilient recoil assembly 80, a retracting tube 82 which is received in the retracting sleeve 44 of the respective inflatable portion 32 thereof and a pair of cables 84 which extend between the retracting tube 82 thereof and the recoil mechanism 80 thereof. Each of the recoil mechanisms 80 includes an elongated channel member 86 which is secured to the mounting board 34 thereof in a substantially vertical disposition within the interior of the respective inner tubular portion 36 thereof. Each of the recoil assemblies 80 further comprises a pair of resiliently retracting bands 88 which are constructed so that they are normally resiliently returned to coiled positions on coils 90 by their own resiliencies unless they are forcibly maintained in unwound positions. The bands 88 preferably comprise stainless steel recoil springs manufactured by Vulcan Spring and Manufacturing Company of Telford, PA and they are mounted on freely rotatable roller shafts 92. The bands 88 and roller shafts 92 of each recoil assembly 80 are mounted on a bracket 94 attached to the channel member 86 thereof. Each of the channel members 86 is preferably of approximately the same length as the respective inner inflatable tubular section 36 thereof and each of the brackets 94 is positioned so that the coils 90 thereof are normally located adjacent the longitudinal center of the respective channel member 86 thereof. Each of the recoil mechanisms 80 further comprises a pair of pulleys 98 which are mounted adjacent opposite ends of the respective channel member 86 thereof for guiding the cables 84 as they pass outwardly to the retracting tube 82 adjacent the upper and lower ends of the side seal sections 20 and 22. Accordingly, when the inflatable portions 32 of the side seal sections 20 and 22 are inflated by the inflating mechanism 24, the retracting tubes 82 are moved outwardly with respect to the wall 12 so that the cables 84 attached thereto are drawn outwardly against the constant force of the bands 80 as the bands 88 are forcibly uncoiled from the coils 90. However, when the inflating mechanism 24 is deactuated, the resiliencies of the bands 88 cause them to be resiliently recoiled onto the coils 90 so that the retracting tubes 82 are drawn inwardly toward the channel members 86 to retract the inflatable portions 32.

The top retracting mechanism 30 which is illustrated in FIGS. 8 and 9 is generally similar in operation to the side retracting mechanisms 28. The top retracting mechanism 30 includes a channel member 100 and a plurality of resilient bands 102 which are automatically resiliently recoiled onto coils 104 unless they are forcibly maintained in uncoiled dispositions. The coils 104 are mounted on rotatable shafts 106 attached to the channel member 100. However, in contrast to the retracting mechanisms 28, the retracting mechanism 30 includes four bands 102 which are assembled in tandem pairs on the channel member 100. Each pair of bands 102 is attached to a slide member 108 which is received in the channel member 100 and each of the slide members 108 is attached to a cable 110 which extends around a roller 112 and downwardly to a retracting tube 114 in the retracting sleeve 72. As a result, the four rolls 104 are operative in tandem pairs for applying a constant retracting force to the tube 114 so that when the inflating mechanism 24 is deactuated, the retracting mechanism 30 is operative for retracting the top seal section 18 to a fully retracted position. In this regard, because the retracting mechanism 30 includes four of the bands 102, it is able to overcome the downward force of the weight of the inflatable portion 52 so that the retracting mechanism 30 is capable of fully retracting the inflatable top portion 52 to the retracted position thereof illustrated in FIG. 1 when the inflating mechanism 28 is deactuated.

For use and operation of the dock seal 10 the truck body 26 is moved into position in front of the opening 16 and the inflating mechanism 24 is actuated to inflate the inflatable portions 32 of the side seal sections 18 and 20 and the inflatable portion 52 of the top seal section 22. As the inflatable portions 32 and 52 are inflated to the expanded dispositions thereof the bands 88 are resiliently unwound from the coils 90 and the bands 102 are resiliently unwound from the coils 104 so that the side seal sections 18 and 20 and the top seal section 22 are expanded by the inflating mechanism 24 against the constant forces of the retracting mechanisms 28 and 30. As the side seal sections 18 and 20 are inflated to the expanded dispositions thereof the inflatable portions 32 thereof expand angularly outwardly from the wall 12 and inwardly and together toward the opening 16 so that the side seal sections 18 and 20 yieldably engage the side surfaces of the truck body 26 without obstructing the rear door opening (not shown) in the truck body 26. Further, as the top seal section 22 is inflated to the expanded disposition thereof the inflatable portion 52 thereof expands downwardly in outwardly spaced relation to the wall 12 so that the inflatable portion 52 yieldably engages the top surface of the truck body 26. As a result, the top seal section 22 and the side seal sections 18 and 20 are effectively operative for enclosing the open area between the wall 12 and the truck body 26 so that the environment inside of the building 14 can be preserved during a loading or an unloading operation. Further, when the loading or unloading operation has been completed a door (not shown) can be moved to a closed position in the opening 16 and the inflating mechanism 24 can be deactuated; and once the inflating mechanism 24 has been deactuated the retracting mechanisms 28 and 30 operate to automatically retract the inflatable portions 32 and 52, respectively, to the retracted dispositions thereof wherein they are retained in closely adjacent relation to the wall 12. The truck body 26 can then be moved from the loading dock opening 16 and another truck body can be moved into position at the loading dock opening 16 for another loading or unloading operation.

A second embodiment of the dock seal of the instant invention is illustrated in FIGS. 10-16 and generally indicated at 116 in FIGS. 10-13. As illustrated in FIGS. 10-13, the dock seal 116 is adapted to be mounted on a wall 118 of a building 120 so that it extends around the top and side extremities of a loading dock opening 122 therein and it includes a pair of opposite side seal sections generally indicated at 124 and 126, a top seal section generally indicated at 128, an inflating mechanism generally indicated at 130, a pair of side retracting mechanisms generally indicated at 132 and a top retracting mechanism generally indicated at 134. The dock seal 116 is adapted to be mounted on the building wall 118 so that the side seal sections 124 and 126 are disposed adjacent opposite side extremities of the loading dock opening 122 and so that the top seal section 128 extends between the side seal sections 124 and 126 adjacent the top extremity of the opening 122. The inflating mechanism 130 is also mounted on the building wall 118 and it is operative for inflating the side seal sections 124 and 126 and the top seal section 128 from the retracted dispositions thereof illustrated in FIG. 10 to the inflated or expanded dispositions thereof illustrated in FIGS. 11-13. The side retracting mechanisms 132 are mounted within the side seal sections 124 and 126 and the top retracting mechanism 134 is mounted within the top seal section 128, and the side and top retracting mechanisms 132 and 134, respectively, are operative for retracting the side seal sections 124 and 126 and the top seal section 128, respectively, to the retracted dispositions thereof illustrated in FIG. 10 upon deactuation of the inflating mechanism 130.

The side seal sections 124 and 126 each include an inflatable portion generally indicated at 136 and a mounting plate 138, and each of the inflatable portions 136 includes elongated inner and outer tubular sections 140 and 141. The inner and outer tubular sections 140 and 141 are preferably constructed from a suitable, flexible, air tight fabric, such as a vinyl coated nylon and an internal partition (not shown) which is preferably made from a suitable flexible screening material extends between the tubular sections 140 and 141 while nevertheless allowing free air communication therebetween. The mounting plates 138 are preferably made of a material such as plywood and each of the inner tubular sections 140 is preferably secured to the respective mounting plate 138 thereof by means of a suitable adhesive and/or staples. Each of the mounting plates 138 is secured to the wall 118 with nails or the like for securing the side sections 124 and 126 to the wall 118.

The top seal section 128 includes an inflatable portion 142 and a mounting plate 143. The inflatable portion 142 includes an elongated inner tubular section 144, an elongated intermediate tubular section 146 and a reduced outer tubular section 148. Each of the tubular sections 144, 146 and 148 preferably includes an outer shell made from a suitable flexible air tight fabric, such as a vinyl coated nylon and the tubular sections 144, 146 and 148 are internally connected via partitions 150 and 152 which are preferably made from a suitable flexible screening material to allow air to pass freely between the tubular sections 144, 146 and 148. The inner tubular section 144 is preferably connected to the mounting plate 143 by suitable means, such as an adhesive and/or staples and an elongated horizontal retracting pocket 154 is formed in the inflatable portion 142 adjacent the outer end of the intermediate tubular section 146. The opposite ends of the inner and outer tubular sections 144 and 146 are connected to the upper ends of the inner and outer tubular sections 140 and 141 of the side seal sections 124 and 126 so that there is open air communication between the interiors of the side seal sections 124 and 126 and the top seal section 128.

The inflating mechanism 130 is mounted on the building wall 118 directly above the top seal section 128 and it includes an air blower 156, an air discharge line 158 and an outer housing 160. The air blower 156 is connected to the top seal section 128 through the discharge line 158 so that it is operative for inflating the inflatable portion 142 of the top seal section 128 and the inflatable portions 136 of the side seal sections 124 and 126. The housing 160 is preferably constructed from a suitable plastic or metal and it is operative for enclosing the blower 156, to protect it from the elements while nevertheless allowing sufficient air to enter the blower 156 to inflate the inflatable portions 136 and 142.

Figure 12:
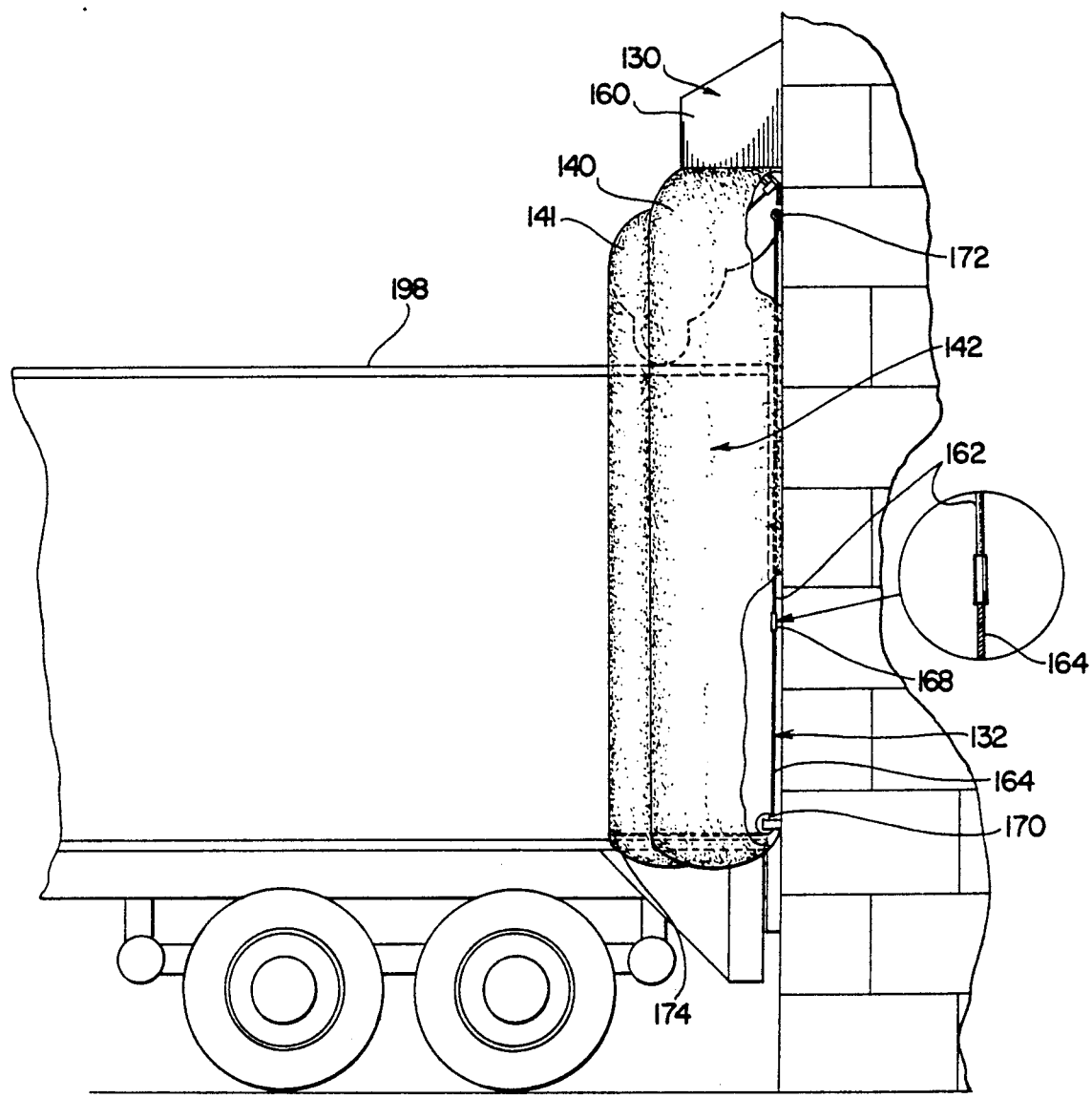
FIG. 12 is a side elevational view of the seal in engagement with the body of a truck.
Figure 13:
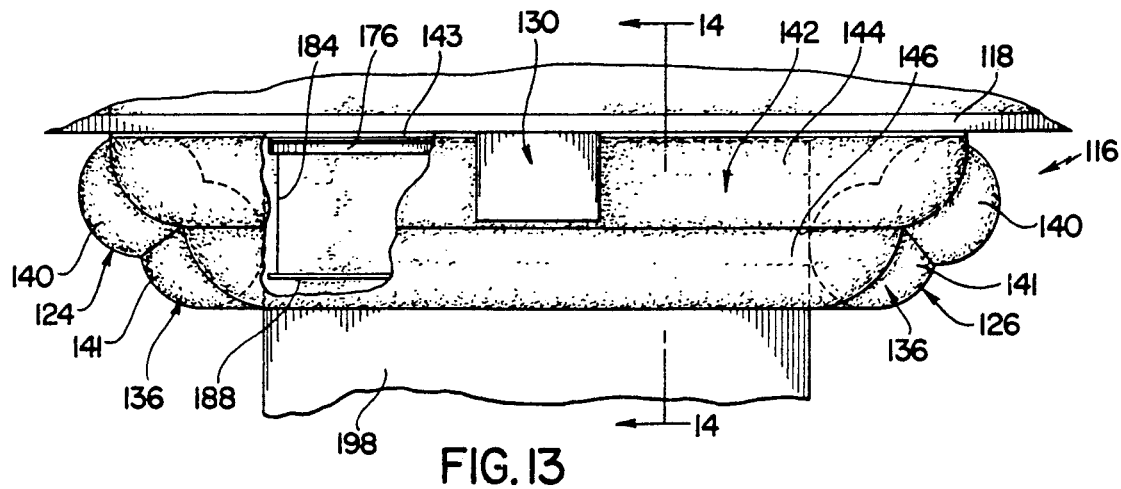
FIG. 13 is a top plan view thereof.

Referring to FIG. 12, one of the side retracting mechanisms 132 is illustrated. As will be seen, each of the side retracting mechanisms 132 comprises an elongated flexible resilient cord section 162, a cable section 164, a connector 168, and a pulley 170. Each of the elongated cord sections 162 preferably comprises an elongated resiliently extendable cord, such as a conventional shock cord, and one end of each of the cord sections 162 is secured with an anchor 172 in the interior of the respective tubular section 140 thereof adjacent the upper end of the respective side seal section 124 or 126 thereof. The lower end of each of the cord sections 162 is secured to the respective cable 164 thereof with one of the connectors 168. Each of the pulleys 170 is mounted in the interior of the respective inner tubular section 140 thereof adjacent the lower end of the respective side section 124 or 126 thereof and the respective cable 164 thereof extends from the respective connector 168 thereof around the respective pulley 170 thereof to a fastener 174 in the interior of the respective outer tubular section 141 of the respective side section 124 or 126 thereof. Each of the cord sections 162 is preferably dimensioned so that it has an at-rest length (unstretched length) which is at least approximately one-half of the height of the respective side seal section 124 or 126 thereof. In this regard, by constructing the cord sections 162 of sufficient lengths, the cord sections 162 are longitudinally extendable without applying excessive restraining forces to the side seal sections 124 and 126, so that the side seal sections 124 and 126 are inflatable to the fully inflated dispositions thereof with the inflating mechanism 130 and they are also fully retractable with the retracting mechanisms 132 when the inflating mechanism 130 is deactuated.

Figure 14:
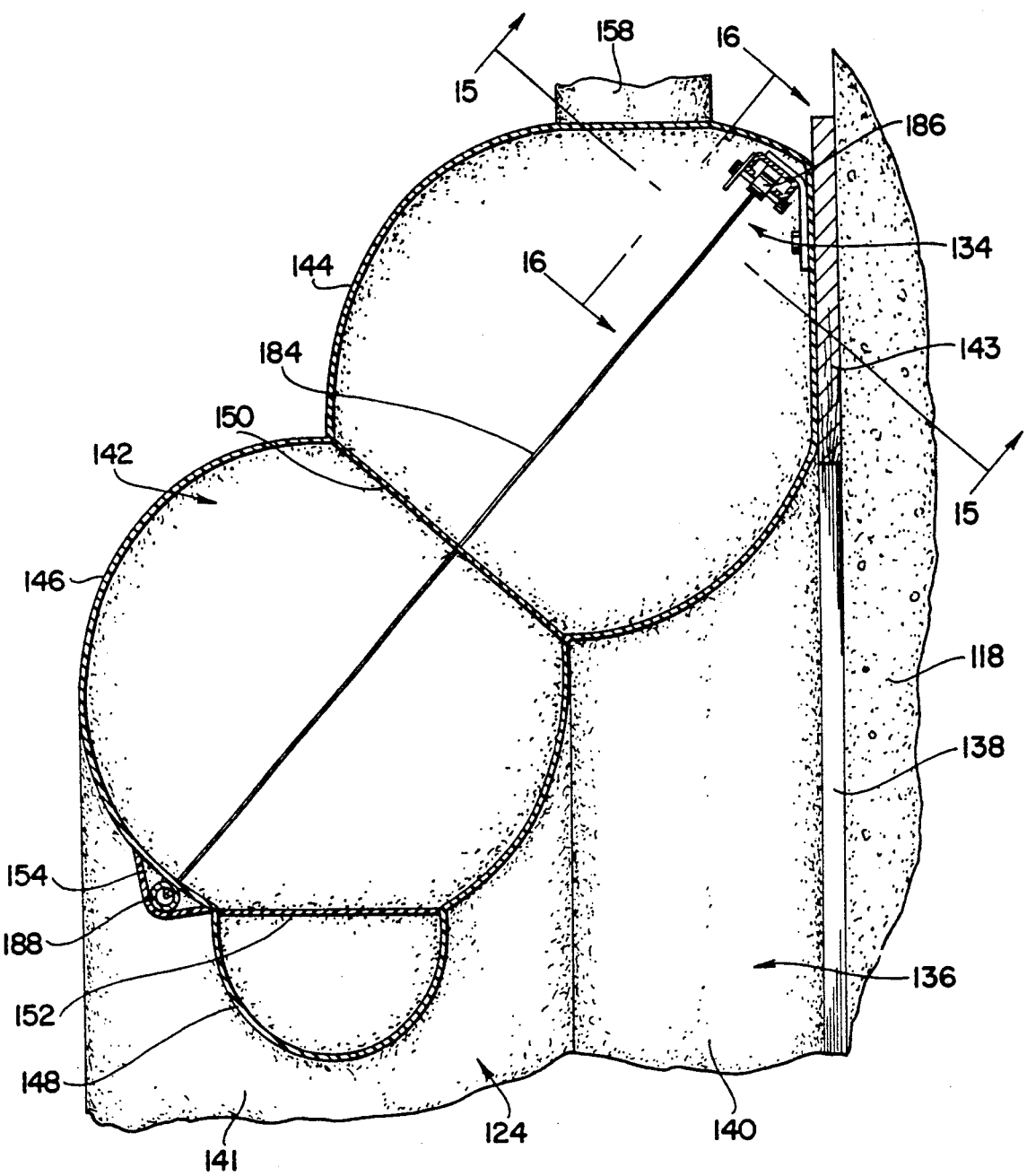
FIG. 14 is a sectional view taken along line 14—14 in FIG. 13.
Figure 15:
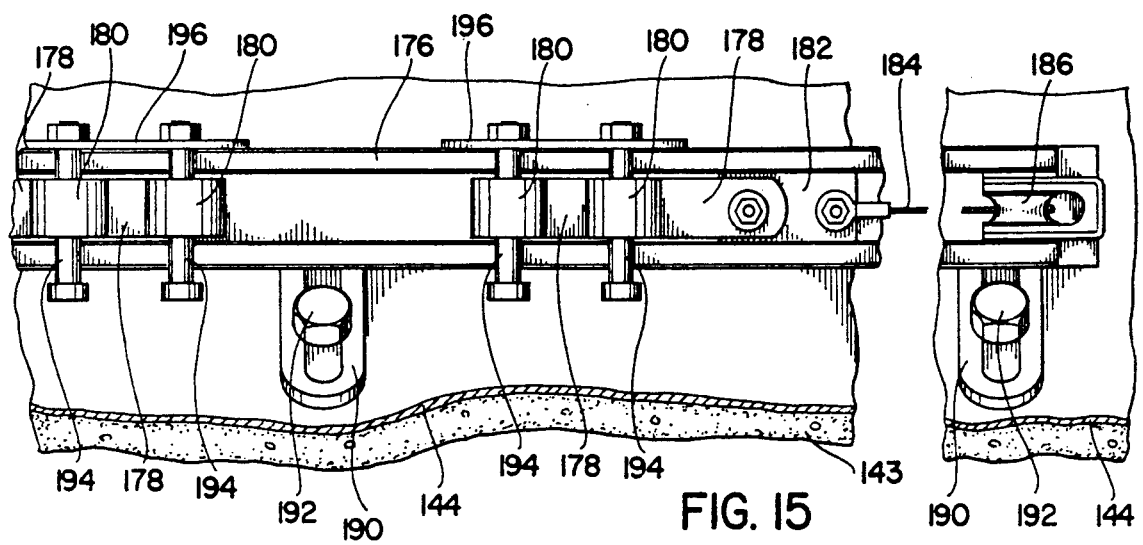
FIG. 15 is a sectional view taken along line 15—15 in FIG. 14.
Figure 16:
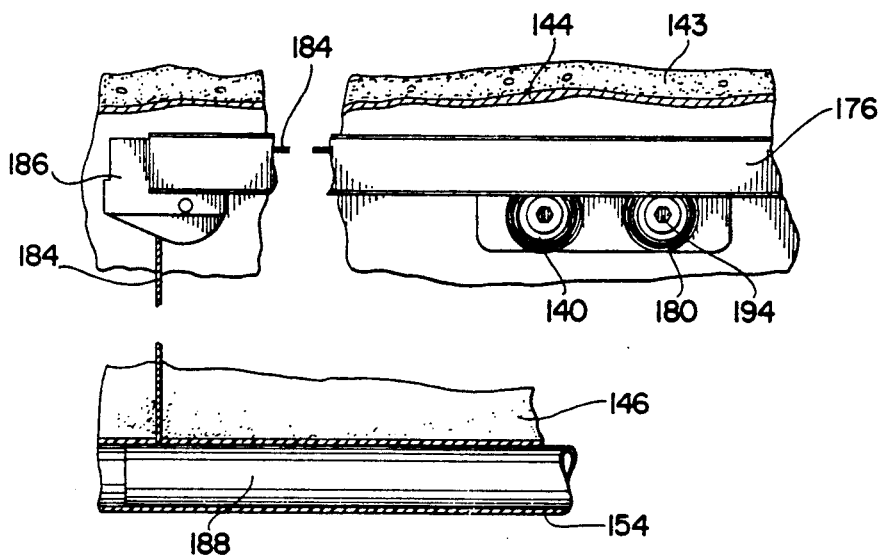
FIG. 16 is a sectional view taken along line 16—16 in FIG. 14.

Referring to FIGS. 14–16, the top retracting mechanism 134 is illustrated. The top retracting mechanism 134 is generally similar in construction to the top retracting mechanism 30 in the dock seal 10 and it includes an elongated channel member 176, four resilient recoil spring bands 178 which are biased to recoiled positions on coils 180, a pair of slide members 182 which are received in the channel member 176, a pair of cables 184 which are attached to the slide members 182, a pair of pulleys 186 with are mounted in the channel member 176 adjacent opposite ends thereof and a retracting tube 188 which is attached to the ends of the cables 184. The channel member 176 is mounted on the mounting plate 143 with angular mounting brackets 190 and bolts 192. The bands 178 are assembled in tandem pairs and the coils 180 are mounted on rotatable shafts 194 which are attached to the channel member 176 with brackets 196. Both of the bands 178 in each pair of bands 178 are attached to the adjacent slide member 182 so that the slide members 182 are longitudinally slidable in the channel member 176 for uncoiling the bands 178 attached thereto from their respective coils 180. The cables 184 are attached to the slide members 182 and they extend around the pulleys 186 to the retracting tube 188. As illustrated in FIG. 14, the retracting tube 188 is received in the pocket 154 so that the cables 184 extend outwardly through the inflatable portion 142 passing through or adjacent to the partition 150 therein. The bands 178 preferably comprises stainless steel recoil springs which are resiliently recoiled on their respective coils 180 without additional recoil springs and hence they are operative for applying substantially constant forces to the cables 184 as the bands 178 are withdrawn from or recoiled onto the coils 180. The bands 178 preferably comprise recoil springs such as those manufactured by Vulcan Spring and Manufacturing Company and because the bands 178 are assembled in tandem pairs, they are effectively operative for retracting the inflatable portion 142 of the top seal section 128 despite the inherent weight of the inflatable portion 142.

Accordingly, for use and operation of the seal 116 a truck body 198 is moved into position at the loading dock opening 122 so that the rear end of the truck body 198 is closely adjacent the wall 118. Thereafter the inflating mechanism 130 is actuated to inflate the side seal sections 124 and 126 and the top seal section 128 so that the inflatable portions 136 and 142 yieldably engage the side surfaces of the truck body 198. As the inflatable portions 136 and 142 are inflated in this manner, the expandable cord elements 162 are longitudinally expanded and the resilient bands 178 are resiliently drawn from the respective coils 180 thereof to allow the retracting rod 188 to be moved downwardly and outwardly. Once the side seal sections 124 and 126 and the top seal section 128 have reached the fully inflated or expanded dispositions thereof they cooperate to enclose the area between the outer surface of the wall 118 and the body of the truck 198 so that the truck 198 can be either loaded or unloaded without disrupting the environment in the interior of the building 120. Once a loading or unloading operation has been completed, a door (not shown) can be moved to a closed position to close the loading dock opening 122 and the inflating mechanism 130 can be deactuated. Once the inflating mechanism 130 has been deactuated, the side retracting mechanisms 132 and the top retracting mechanism 134 operate to automatically retract the side seal sections 124 and 126 and the top seal section 128, respectively, so that the side seal sections 124 and 126 and the top seal section 128 are retained in closely adjacent relation to the exterior surface of the wall 118. Thereafter, the truck 198 can be moved and another truck can be moved into position adjacent the loading dock opening 122.

It is seen therefore that the instant invention provides an effective dock seal for enclosing the open area surrounding a loading dock opening in a building wall. The seal 10 includes the side seal sections 20 and 22 which extend angularly outwardly for engaging the side surfaces of the truck body 26 and the dock seal 116 includes the side seal sections 124 and 126 which extend angularly outwardly for similarly engaging the side surfaces of a truck body 198. As a result, the seals 10 and 116 are operative without interfering with or obstructing the door openings in the rear portions of the truck bodies 26 and 198. Further, the seal 10 includes the retracting mechanisms 28 and 30 which are operative for fully retracting the side seal sections 20 and 22 and the top seal section 18, and the seal 116 includes the retracting mechanisms 132 and 134 which are operative for fully retracting the side seal sections 124 and 126 and the top seal section 128. Further, since the retracting mechanisms 28 and 30 of the seal 10 and the retracting mechanisms 132 and 134 of the seal 116 are mounted in the interiors of inflatable portions of the seals 10 and 116, respectively, the retracting mechanisms 28, 30, 132 and 134 are all fully protected from the environments on the exteriors of the buildings 14 and 120 so that they can be reliably utilized for retracting their respective seal sections. Accordingly, it is seen that the instant invention represents a significant advancement in the art relating to dock seals which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. In an inflatable dock seal for a loading dock opening in a building wall, said opening having opposite side extremities and a top extremity extending between said side extremities, said dock seal including a pair of opposite side seal sections securable to said wall adjacent opposite side extremities of said opening, a top seal section securable to said wall adjacent the top extremity of said opening so that said top seal section extends between said side seal sections, each of said side seal sections and said top seal section including an inflatable portion which is inflatable to an expanded disposition and retractable to a collapsed disposition, means for inflating said inflatable portions to the expanded dispositions thereof and means for retracting said inflatable portions to the collapsed dispositions thereof upon deactuation of said inflating means, the improvement comprising said retracting means comprising substantially constant force resilient spring means for retracting at least a portion of said inflatable portions, said resilient spring means applying substantially constant, uniform retracting forces to said portion of said inflatable portions as said inflatable portions are moved between the collapsed and the expanded dispositions thereof.

2. In the dock seal of claim 1, said spring means comprising a plurality of resilient recoil springs.

3. In the dock seal of claim 1, said spring means comprising a pair of resilient side retracting assemblies and a resilient top retracting assembly, said side and top retracting assemblies being mounted within the inflatable portions of said side seal sections and said top seal section, respectively, and being operative for retracting said side seal sections and said top seal section, respectively.

4. In the dock seal of claim 2, said spring means comprising a pair of side resilient recoil spring mechanisms and a top resilient recoil spring mechanisms, one of said side recoil spring mechanisms being mounted in the inflatable portion of each of said side seal sections, said top recoil spring mechanism being mounted in the inflatable portion of said top seal section.

5. In the dock seal of claim 4, each of said side resilient recoil spring mechanisms and said top resilient recoil spring mechanism comprising a pair of resiliently recoiling bands.

6. In the dock seal of claim 1, the inflatable portions of said side seal sections expanding primarily in directions extending angularly outwardly from said wall and inwardly and together toward said opening when they are inflated to the expanded dispositions thereof.

7. In the dock seal of claim 1, said top seal sections including support means securable to said wall for supporting the inflatable portion of said top seal section in outwardly spaced relation to said wall, the inflatable portion of said top seal section expanding primarily in a downwardly extending direction as it is inflated to the expanded disposition thereof.

8. In the dock seal of claim 7, said side seal sections having upper ends and being unsupported at the upper ends thereof.

9. In the dock seal of claim 8, said support means comprising a substantially horizontal platform securable to said wall so that it extends outwardly therefrom, said support means also supporting said inflating means above said opening.

10. In the dock seal of claim 1, said substantially constant force resilient spring means comprising a top resilient recoil spring mechanism for retracting the inflatable portion of said top seal section, said retracting means further comprising a pair of elongated resilient cord side retracting mechanisms for retracting the inflatable portions of said side seal sections.

11. In the dock seal of claim 10, each of said side retracting mechanisms including an elongated resiliently extendable cord for retracting the respective inflatable portion thereof.

12. In the dock seal of claim 11, each of said resiliently extendable cords having an unstretched length which is at least half of the height of the respective side seal section thereof.

13. In the dock seal of claim 11, each of said elongated resiliently extendable cords being disposed within the respective inflatable portion thereof.

14. In the dock seal of claim 1, said substantially constant force resilient spring means comprising a top resilient recoil spring mechanism for retracting the inflatable portion of said top seal section, said retracting means further comprising a pair of elongated resiliently extendable members for retracting the inflatable portions of said side seal sections, each of said resiliently extendable members having an at-rest length which is at least approximately half of the height of the respective side seal section thereof.

* * * * *